(12) United States Patent
Agata et al.

(10) Patent No.: US 11,034,354 B2
(45) Date of Patent: Jun. 15, 2021

(54) START CONTROL DEVICE, START CONTROL METHOD, AND VEHICLE

(71) Applicant: HONDA MOTOR CO., LTD., Tokyo (JP)

(72) Inventors: Masaya Agata, Wako (JP); Shuji Kamata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 16/578,745

(22) Filed: Sep. 23, 2019

(65) Prior Publication Data

US 2020/0094841 A1 Mar. 26, 2020

(30) Foreign Application Priority Data

Sep. 26, 2018 (JP) .............................. JP2018-180777

(51) Int. Cl.
*F16D 48/02* (2006.01)
*B60W 30/192* (2012.01)
(Continued)

(52) U.S. Cl.
CPC .......... *B60W 30/192* (2013.01); *B60W 10/02* (2013.01); *B60W 10/04* (2013.01);
(Continued)

(58) Field of Classification Search
CPC .... B60W 30/192; B60W 10/04; B60W 10/02; B60W 2710/022; B60W 10/06; B60W 10/08; B60W 30/18; F16D 25/14; F16D 48/08; F16D 2500/1026; F16D 2500/30415; F16D 2500/30406; F16D 2500/106; F16D 2500/50883; F16D 2500/50239; F16D 2500/30816; F16D 2500/3111;
(Continued)

(56) References Cited

U.S. PATENT DOCUMENTS

2010/0167872 A1* 7/2010 Shirasaka ......... F16H 61/66272
477/45
2016/0229387 A1* 8/2016 Hata ..................... B60W 20/40
(Continued)

FOREIGN PATENT DOCUMENTS

JP 2018-083509 A 5/2018
WO 2010/073765 A1 7/2010

OTHER PUBLICATIONS

Office Action dated Jun. 16, 2020 issued over the corresponding Japanese Patent Application No. 2018-180777 with the English translation thereof.

*Primary Examiner* — David J Hlavka
(74) *Attorney, Agent, or Firm* — Carrier Blackman & Associates, P.C.; Joseph P. Carrier; Jeffrey T. Gedeon

(57) ABSTRACT

A start control device is a start control device that controls start of a vehicle including a clutch that is engaged by the hydraulic pressure supplied from a hydraulic pressure supply source and a start device that starts a vehicle driving source, and includes: a hydraulic pressure control unit that controls so that the hydraulic pressure supply source supplies the hydraulic pressure to the clutch if a start condition for the vehicle is satisfied; and a start device control unit that controls the start device so that the rotation speed of the vehicle driving source reaches the predetermined rotation speed after the clutch is engaged.

8 Claims, 3 Drawing Sheets

(51) Int. Cl.
  *F16D 48/08* (2006.01)
  *B60W 10/04* (2006.01)
  *B60W 10/02* (2006.01)

(52) U.S. Cl.
  CPC ............ *F16D 25/14* (2013.01); *F16D 48/08* (2013.01); *B60Y 2300/192* (2013.01); *F16D 2500/106* (2013.01); *F16D 2500/1026* (2013.01); *F16D 2500/30406* (2013.01); *F16D 2500/30415* (2013.01)

(58) Field of Classification Search
  CPC ... F16D 2500/31426; F16D 2500/3144; B60K 2006/268; B60K 6/485; B60K 3/26
  See application file for complete search history.

(56) References Cited

U.S. PATENT DOCUMENTS

2016/0375893 A1* 12/2016 Nefcy ................... B60W 10/08
                                                        701/22
2019/0092334 A1*  3/2019 Demain ................ B60W 10/04

\* cited by examiner

START CONTROL DEVICE, START CONTROL METHOD, AND VEHICLE

CROSS-REFERENCE TO RELATED APPLICATION

This application is based upon and claims the benefit of priority from Japanese Patent Application No. 2018-180777 filed on Sep. 26, 2018, the contents of which are incorporated herein by reference.

BACKGROUND OF THE INVENTION

Field of the Invention

The present invention relates to a start control device, a start control method, and a vehicle.

Description of the Related Art

For saving fuel, reducing exhaust emission, reducing noise, and so on, a vehicle with a function of stopping an engine automatically when a predetermined condition is satisfied has been suggested. Such a function is called an idle stop function. For example, in such a vehicle, the engine is stopped when the speed of the vehicle is zero, an accelerator pedal is not operated, or a braking pedal is operated. When the engine is restarted, for example, the hydraulic pressure accumulated in an accumulator is supplied to a clutch so that the clutch is engaged.

According to International Publication No. WO 2010/073765, an electromagnetic open/close valve is opened before a vehicle driving source is restarted, so that the hydraulic pressure accumulated in an accumulator is supplied to a hydraulic servo. In International Publication No. WO 2010/073765, the electromagnetic open/close valve can be opened for sure when the vehicle driving source is restarted.

SUMMARY OF THE INVENTION

However, in International Publication No. WO 2010/073765, a clutch may be engaged with the vehicle driving source having too high rotation speed. If the clutch is engaged with the vehicle driving source having too high rotation speed, an engagement shock may occur.

An object of the present invention is to provide a start control device, a start control method, and a vehicle that enable a quick start of a vehicle while suppressing a clutch engagement shock.

A start control device according to one aspect of the present invention is a start control device configured to control start of a vehicle, the vehicle including a clutch that is engaged by a hydraulic pressure supplied from a hydraulic pressure supply source and a start device that starts a vehicle driving source, the start control device including: a hydraulic pressure control unit configured to control in a manner that the hydraulic pressure supply source supplies the hydraulic pressure to the clutch if a start condition for the vehicle is satisfied; and a start device control unit configured to control the start device in a manner that a rotation speed of the vehicle driving source reaches a predetermined rotation speed after the clutch is engaged.

A vehicle according to another aspect of the present invention includes the start control device as described above.

A start control method according to another aspect of the present invention is a start control method for controlling start of a vehicle, the vehicle including a clutch that is engaged by a hydraulic pressure supplied from a hydraulic pressure supply source and a start device that starts a vehicle driving source, the start control method including: a step of supplying the hydraulic pressure from the hydraulic pressure supply source to the clutch if a start condition for the vehicle is satisfied; and a step of controlling the start device in a manner that a rotation speed of the vehicle driving source reaches a predetermined rotation speed after the clutch is engaged.

According to the present invention, the start control device, the start control method, and the vehicle that enable a quick start of the vehicle while suppressing a clutch engagement shock can be provided.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a start control device, a start control method, and a vehicle according to the present invention is described in detail with reference to the attached drawings.

Embodiment

Figure 1:
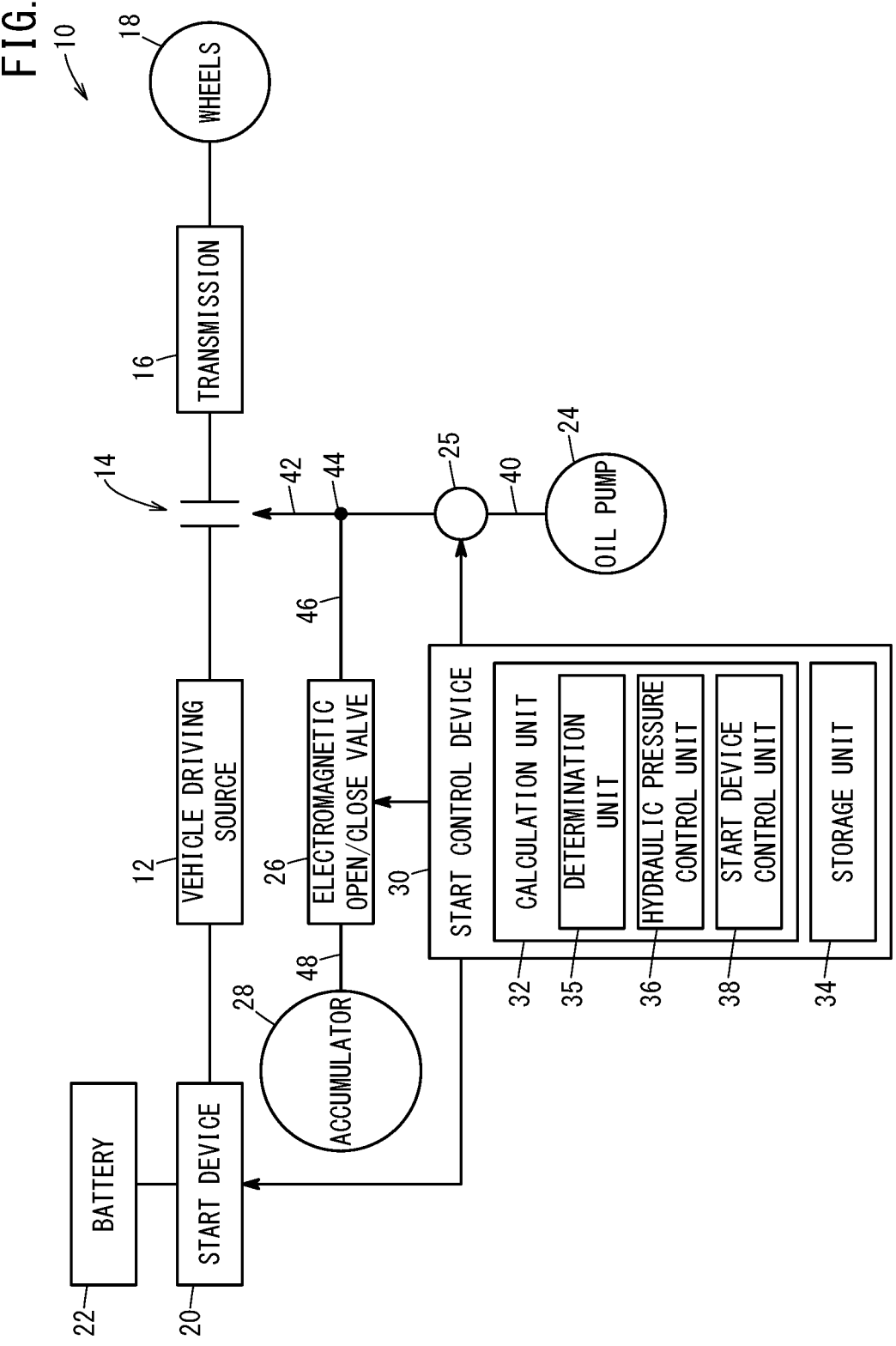
FIG. 1 is a block diagram conceptually illustrating a vehicle including a start control device according to one embodiment.

A start control device, a start control method, and a vehicle according to one embodiment are described with reference to the drawings. FIG. 1 is a block diagram conceptually illustrating the vehicle including the start control device according to the present embodiment.

As illustrated in FIG. 1, a vehicle 10 includes a vehicle driving source 12, a clutch 14, a transmission 16, wheels 18, a start device 20, and a battery 22. The vehicle 10 further includes an oil pump 24, a valve 25, an electromagnetic open/close valve 26, and an accumulator (hydraulic pressure supply source) 28. The vehicle 10 additionally includes a start control device 30 according to the present embodiment. Although the vehicle 10 includes other components than those above, they are not illustrated. In order to simplify the description, some components are illustrated conceptually.

The vehicle driving source 12 is an engine, for example, but is not limited thereto. The clutch 14 is provided between the vehicle driving source 12 and the transmission 16. The driving force of the vehicle driving source 12 can be transmitted to the wheels 18 through the clutch 14 and the transmission 16. The transmission 16 can be a continuously variable transmission (CVT), for example, but is not limited thereto.

The start device 20 is coupled to a crank shaft (not shown) in the vehicle driving source 12 through a motive power transmission mechanism. The motive power transmission mechanism is a belt, a pulley, or the like, but is not limited to these examples. The start device 20 can start the vehicle driving source 12 and can also generate power. That is to say, the start device 20 includes a function as an electric motor that drives and rotates the crank shaft and a function as a power generator that generates electric power through driving and rotating by the crank shaft. The start device 20 with such a structure is referred to as an integrated starter generator. The start device 20 is connected to the battery 22. The start device 20 can drive and rotate the crank shaft using the electric power supplied from the battery 22. The electric power generated by the start device 20 can be supplied to the battery 22.

While the vehicle 10 is traveling, the oil pump 24 is operated. As the oil pump 24 is operated, hydraulic pressure can be generated. An oil passage 40 connected to the oil pump 24 can communicate with an oil passage 42 through the valve 25. The oil passage 42 is connected to the clutch 14. The engagement and disengagement of the clutch 14 can be controlled by the hydraulic pressure in the oil passage 42. The hydraulic pressure in the oil passage 42 can be controlled by opening and closing the valve 25. When the hydraulic pressure in the oil passage 42 has become a threshold or more, the clutch 14 is engaged. On the other hand, when the hydraulic pressure in the oil passage 42 has become less than the threshold, the clutch 14 is disengaged. The oil passage 42 is connected to a branch oil passage (oil passage) 46 at a connection point 44. The branch oil passage 46 is connected to an oil passage 48 through the electromagnetic open/close valve 26. The oil passage 48 is connected to the accumulator 28. The hydraulic pressure generated by the oil pump 24 can be accumulated in the accumulator 28 through the oil passage 40, the branch oil passage 46, and the oil passage 48. The hydraulic pressure accumulated in the accumulator 28 can be supplied to the clutch 14 through the oil passage 48, the branch oil passage 46, and the oil passage 42. The valve 25 and the electromagnetic open/close valve 26 can be controlled by a hydraulic pressure control unit 36, which is described below. Note that one valve 25 among a plurality of valves constituting a valve group (not shown) is illustrated in FIG. 1.

If current is not supplied to a solenoid (not shown) in the electromagnetic open/close valve (electromagnetic valve device) 26, that is, if the current supply to the solenoid is OFF, the electromagnetic open/close valve 26 can operate as follows. That is to say, the electromagnetic open/close valve 26 can operate such that when the hydraulic pressure in the oil passage 46 is higher than that in the oil passage 48, the hydraulic pressure equivalent to that in the oil passage 46 is accumulated in the accumulator 28. On the other hand, the electromagnetic open/close valve 26 can operate so that when the hydraulic pressure in the oil passage 46 is lower than that in the oil passage 48, the hydraulic pressure accumulated in the accumulator 28 is kept in the accumulator 28. If current is supplied to the solenoid in the electromagnetic open/close valve 26, that is, if the current supply to the solenoid is ON, the electromagnetic open/close valve 26 can operate as follows. That is to say, the electromagnetic open/close valve 26 can operate such that the hydraulic pressure accumulated in the accumulator 28 is supplied to the clutch 14 through the oil passage 48, the branch oil passage 46, and the oil passage 42. The electromagnetic open/close valve 26 that can function as above can be configured by using a check valve (not shown) or the like as appropriate, for example.

The start control device 30 includes a calculation unit 32 and a storage unit 34. The calculation unit 32 may include, for example, a central processing unit (CPU). The storage unit 34 includes, for example, a nonvolatile memory and a volatile memory (neither is shown). By the control of each unit on the basis of programs stored in the storage unit 34, the start of the vehicle 10 is controlled.

The calculation unit 32 includes a determination unit 35, the hydraulic pressure control unit 36, and a start device control unit 38. The determination unit 35, the hydraulic pressure control unit 36, and the start device control unit 38 can be achieved when the calculation unit 32 executes the programs stored in the storage unit 34. The determination unit 35 determines whether a start condition for the vehicle 10 has been satisfied. The start condition for the vehicle 10 is that the speed of the vehicle 10 is zero, a brake pedal (not shown) is not operated, or an accelerator pedal (not shown) is operated, for example, but is not limited to these examples. The hydraulic pressure control unit 36 controls such that the hydraulic pressure is supplied from the accumulator 28 to the clutch 14 if the start condition for the vehicle 10 is satisfied. The start device control unit 38 controls the start device 20 such that the rotation speed of the vehicle driving source 12 reaches a predetermined rotation speed Npd after the clutch 14 is engaged. The predetermined rotation speed Npd is the rotation speed at which clutch slip could occur in the engagement of the clutch 14. The predetermined rotation speed Npd is about 500 rpm, for example, but is not limited to this value.

The time after a start command is input from the start device control unit 38 to the start device 20 and before the rotation speed of the vehicle driving source 12 reaches the predetermined rotation speed Npd, is defined as a first time T1. The time after the supply of the hydraulic pressure from the accumulator 28 to the clutch 14 is started and before the clutch 14 is engaged, is defined as a second time T2. The second time T2 is about 250 ms, for example, but is not limited to this value. The first time T1 is shorter than the second time T2. The start device control unit 38 delays the timing to input the start command to the start device 20, by a predetermined time Tpd, which corresponds to the time obtained by subtracting the first time T1 from the second time T2, with respect to a timing that the start condition for the vehicle 10 is satisfied.

Figure 2:
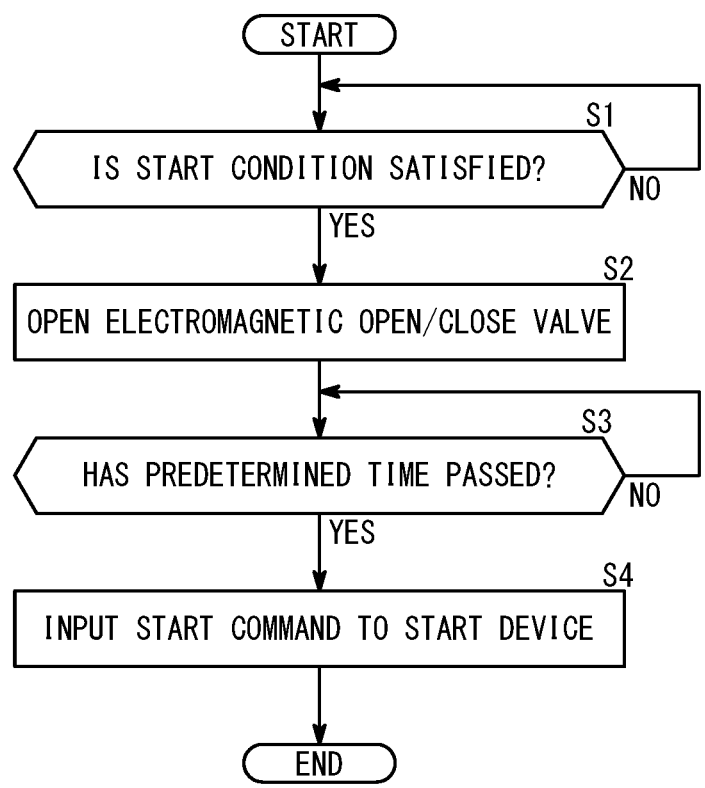
FIG. 2 is a flowchart of an operation of the start control device according to the embodiment.

FIG. 2 is a flowchart of the operation of the start control device according to the present embodiment. FIG. 2 shows the operation when the vehicle 10 is started.

In step S1, the determination unit 35 determines whether the start condition for the vehicle 10 is satisfied. As described above, the start condition for the vehicle 10 is that the speed of the vehicle 10 is zero, the brake pedal is not operated, or the accelerator pedal is operated, for example, but is not limited to these examples. If the start condition for the vehicle 10 is satisfied (Yes in step S1), the process advances to step S2. If the start condition for the vehicle 10 is not satisfied (No in step S1), step S1 is repeated.

In step S2, the hydraulic pressure control unit 36 opens the electromagnetic open/close valve 26. When the electromagnetic open/close valve 26 is opened, the hydraulic pressure accumulated in the accumulator 28 is supplied to the clutch 14 through the oil passage 48, the branch oil passage 46, and the oil passage 42. After that, the process advances to step S3.

In step S3, the start device control unit 38 determines whether the predetermined time Tpd has passed after the start condition for the vehicle 10 is satisfied. The predetermined time Tpd is the time corresponding to the time obtained by subtracting the first time T1 from the second time T2 as described above. For example, the time obtained by adding a certain margin to the time obtained by subtracting the first time T1 from the second time T2 may correspond to the predetermined time Tpd. As described above, the first time T1 is the time after the start command is input from the start device control unit 38 to the start device 20 and before the rotation speed of the vehicle driving source 12 reaches the predetermined rotation speed Npd. Moreover, as described above, the second time T2 is the time after the supply of the hydraulic pressure from the accumulator 28 to the clutch 14 is started and before the clutch 14 is engaged. If the predetermined time Tpd has passed after the start condition for the vehicle 10 is satisfied (Yes in step S3), the process advances to step S4. If the predetermined time Tpd has not passed after the start condition for the vehicle 10 is satisfied, step S3 is repeated.

In step S4, the start device control unit 38 inputs the start command to the start device 20. For example, starting to supply a target torque signal, which is a signal expressing a target torque of the start device 20, from the start device control unit 38 to the start device 20 may correspond to inputting of the start command to the start device 20.

Figure 3:
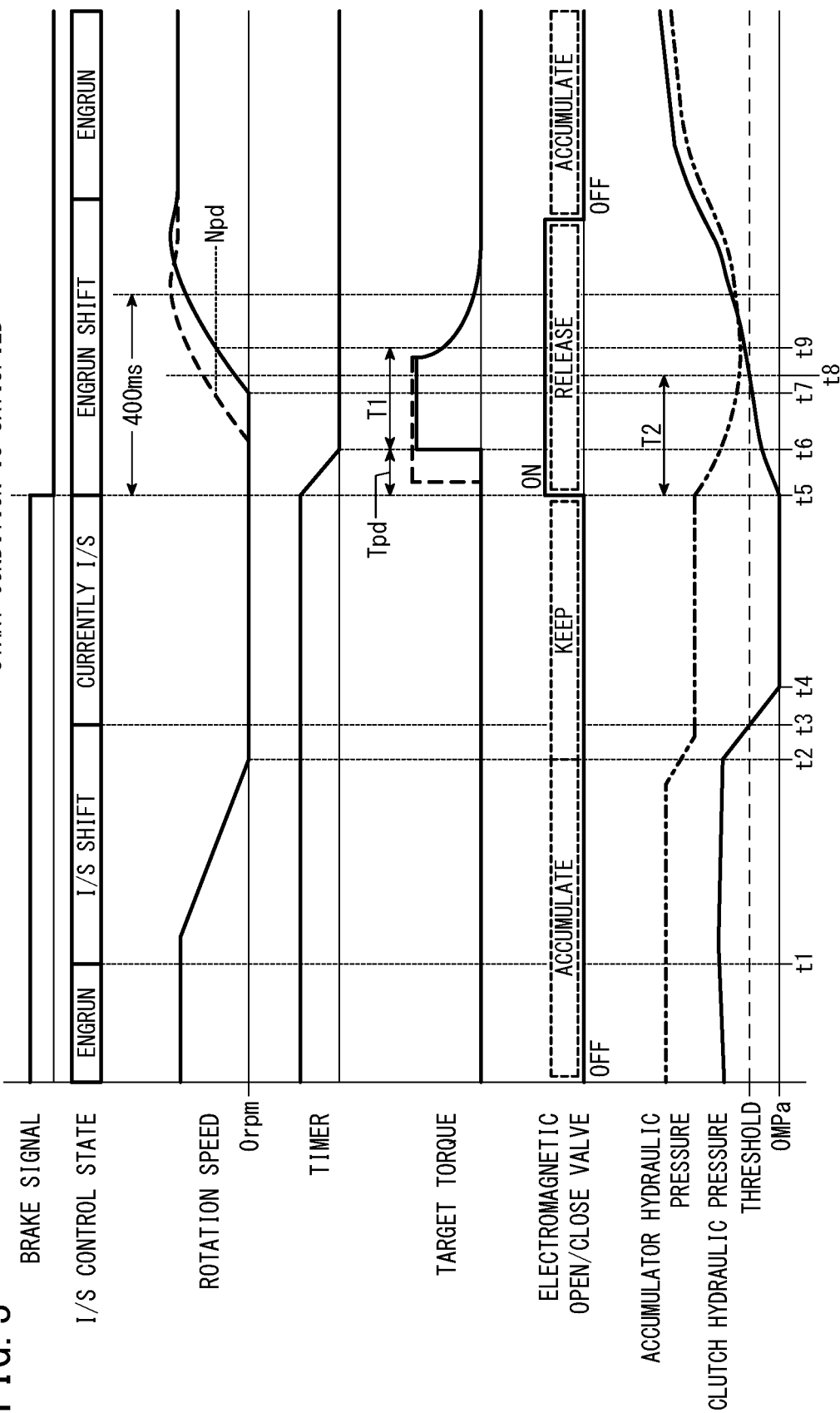
FIG. 3 is a time chart of one example of the operation of the start control device according to the embodiment.

FIG. 3 is a time chart of one example of the operation of the start control device according to the present embodiment. In FIG. 3, a horizontal axis indicates time. FIG. 3 shows an example in which an idle stop is performed.

FIG. 3 shows a brake signal. The brake signal is a signal expressing whether the brake pedal is operated. While the user is operating the brake pedal (not shown), the brake signal is at an H level, for example. While the user is not operating the brake pedal, the brake signal is at an L level, for example. The timing that the brake signal changes from the H level to the L level, for example, may correspond to the timing that the start condition for the vehicle 10 is satisfied. Although the timing that the brake signal changes from the H level to the L level is the timing that the start condition for the vehicle 10 is satisfied in the following explanation, the timing is not limited thereto.

FIG. 3 also shows a control state for an idle stop mechanism, that is, an I/S control state. In "ENGRUN", the vehicle driving source 12 is operated normally. In "I/S shift", the state shifts from the state where the vehicle driving source 12 is operated normally to the idle stop. In "currently I/S", the idle stop is currently performed. In "ENGRUN shift", the state shifts from the idle stop state to the state where the vehicle driving source 12 is operated normally.

FIG. 3 also shows the rotation speed of the engine. The rotation speed of the vehicle driving source 12 in the present embodiment is shown by a solid line. The rotation speed of the vehicle driving source 12 in a comparative example is shown by a dashed line. FIG. 3 also shows time measuring by a timer. In FIG. 3, the time measuring by the timer is shown conceptually. FIG. 3 also shows the target torque signal. This target torque signal is supplied from the start device control unit 38 to the start device 20. In the present embodiment, the target torque signal is shown by a solid line. The target torque signal in the comparative example is shown by a dashed line.

FIG. 3 also shows the state of the electromagnetic open/close valve 26. The state "accumulate" shows a state in which the hydraulic pressure is accumulated in the accumulator 28 as the oil pump 24 is operated. The state "keep" shows a state in which the hydraulic pressure accumulated in the accumulator 28 is kept. The state "release" shows a state in which the hydraulic pressure accumulated in the accumulator 28 is supplied to the oil passages 46, 42. The electromagnetic open/close valve 26 is closed in the states "accumulate" and "keep", and is open in the state "release". FIG. 3 also shows the hydraulic pressure in the accumulator 28, that is, the accumulator hydraulic pressure. FIG. 3 also shows the hydraulic pressure to be supplied to the clutch 14, that is, the clutch hydraulic pressure.

At a timing t1, the state starts to shift from the state where the vehicle driving source 12 is operated normally to the idle stop. As the state shifts from the state where the vehicle driving source 12 is operated normally to the idle stop, the rotation speed of the vehicle driving source 12 gradually decreases.

At a timing t2, the rotation speed of the vehicle driving source 12 becomes zero. When the rotation speed of the vehicle driving source 12 has become zero, the oil pump 24 stops to drive, and the hydraulic pressure that is supplied to the clutch 14 decreases.

At a timing t3, the hydraulic pressure that is supplied to the clutch 14 becomes less than the threshold. If the hydraulic pressure that is supplied to the clutch 14 becomes less than the threshold, the clutch 14 is opened. Thus, the idling is stopped.

At a timing t4, the hydraulic pressure that is supplied to the clutch 14 becomes zero. The hydraulic pressure control unit 36 controls so as to close the valve 25 at a proper timing.

At a timing t5, the start condition for the vehicle 10 is satisfied. When the start condition for the vehicle 10 has been satisfied, the hydraulic pressure control unit 36 controls so as to open the electromagnetic open/close valve 26. Thus, the hydraulic pressure accumulated in the accumulator 28 is supplied to the clutch 14 through the oil passage 48, the branch oil passage 46, and the oil passage 42. Since the hydraulic pressure is supplied to the branch oil passage 46 and the oil passage 42 through the oil passage 48, the hydraulic pressure in the accumulator 28 decreases gradually. On the other hand, since the hydraulic pressure accumulated in the accumulator 28 is supplied to the oil passage 42, the hydraulic pressure that is supplied to the clutch 14 increases gradually. At a timing t7, the timer starts to measure the time.

At a timing t6, the timer finishes measuring the time. The time from the timing t5 to the timing t6 corresponds to the predetermined time Tpd. At the timing t6, the start device control unit 38 inputs the start command to the start device 20. Specifically, the target torque signal is supplied from the start device control unit 38 to the start device 20. Thus, the start device 20 starts and at the timing t7, the vehicle driving source 12 starts to rotate.

At a timing t8, the hydraulic pressure that is supplied to the clutch 14 becomes the threshold or more. When the hydraulic pressure that is supplied to the clutch 14 has become the threshold or more, the clutch 14 is engaged. The clutch 14 is engaged before the rotation speed of the vehicle driving source 12 reaches the predetermined rotation speed Npd. Since the clutch 14 is engaged before the rotation speed of the vehicle driving source 12 reaches the predetermined rotation speed Npd, the engagement shock can be suppressed. The time from the timing t5 to the timing t8 corresponds to the second time T2. Once the clutch 14 is engaged, the vehicle 10 starts to travel and the oil pump 24 starts to operate. The hydraulic pressure control unit 36 controls so as to open the valve 25. Thus, the hydraulic pressure in the accumulator 28 and the hydraulic pressure in the clutch 14 increase gradually.

At a timing t9, the rotation speed of the vehicle driving source 12 reaches the predetermined rotation speed Npd. The time from the timing t6 to the timing t9 corresponds to the first time T1. From the viewpoint of the drivability, the time after the start condition for the vehicle 10 is satisfied and before the rotation speed of the vehicle driving source 12 reaches the predetermined rotation speed Npd is preferably within 400 ms.

Performance of the start device 20 is being improved in order to start the vehicle 10 quickly. As the start device 20 achieves better performance, it takes shorter after the start command is input from the start device control unit 38 to the start device 20 and before the rotation speed of the vehicle driving source 12 reaches the predetermined rotation speed Npd. In the comparative example in which the time after the start condition for the vehicle 10 is satisfied and before the start command is input to the start device 20 is relatively short, the following occurs. That is to say, before the timing t9 when the clutch 14 is engaged, the rotation speed of the vehicle driving source 12 reaches the predetermined rotation speed Npd. If the rotation speed of the vehicle driving source 12 reaches the predetermined rotation speed Npd before the clutch 14 is engaged, the engagement shock may occur when the clutch 14 is engaged. On the other hand, in the present embodiment, the timing that the start command is input to the start device 20 can be delayed by the predetermined time Tpd with respect to the timing that the start condition for the vehicle 10 is satisfied. The predetermined time Tpd is the time corresponding to the time obtained by subtracting the first time T1 from the second time T2 as described above. The first time T1 is, as described above, the time after the start command is input from the start device control unit 38 to the start device 20 and before the rotation speed of the vehicle driving source 12 reaches the predetermined rotation speed Npd. The second time T2 is, as described above, the time required after the supply of the hydraulic pressure from the accumulator 28 to the clutch 14 is started and before the clutch 14 is engaged. The timing that the start command is input to the start device 20 is delayed by the predetermined time Tpd with respect to the timing that the start condition for the vehicle 10 is satisfied; therefore, in the present embodiment, the clutch 14 is engaged before the rotation speed of the vehicle driving source 12 reaches the predetermined rotation speed Npd. Since the clutch 14 is engaged before the rotation speed of the vehicle driving source 12 reaches the predetermined rotation speed Npd, the engagement shock can be suppressed in the present embodiment. Thus, in the present embodiment, even if the start device 20, in which the time after the start command is input to the start device 20 and before the rotation speed of the vehicle driving source 12 reaches the predetermined rotation speed Npd is relatively short, is used, the engagement shock of the clutch 14 can be suppressed. Thus, according to the present embodiment, it is possible to provide the start control device 30 that can start quickly the vehicle 10 while suppressing the engagement shock of the clutch 14.

Modified Embodiment

The preferred embodiment of the present invention has been described; however, the present invention is not limited to the aforementioned embodiment and various modifications are possible without departing from the gist of the present invention.

For example, the above embodiment describes the case in which the vehicle driving source 12, which is automatically stopped when the predetermined stop condition is satisfied, is restarted, that is, the vehicle is restarted from the idle stop state; however, the present invention is not limited to this example. The present invention is also applicable when the vehicle 10, which has been unused for a while, is started.

In the above embodiment, the start device 20 is coupled to the crank shaft through the motive power transmission mechanism such as a belt; however, the present invention is not limited to this example. The start device 20 may be provided between the vehicle driving source 12 and the clutch 14.

In the above embodiment, the hydraulic pressure accumulated in the accumulator 28 is supplied to the clutch 14, so that the clutch 14 is engaged; however, the present invention is not limited to this example. The hydraulic pressure may be supplied to the clutch 14 by driving the oil pump 24, so that the clutch 14 is engaged. The oil pump 24 can function as the hydraulic pressure supply source that supplies the hydraulic pressure to the clutch 14.

In the above embodiment, the start device control unit 38 supplies the start command to the start device 20 after the predetermined period Tpd; however, the present invention is not limited to this example. The start control device 30 may supply the start command to the start device 20 after the clutch 14 is engaged. Whether the clutch 14 is engaged can be determined by, for example, the determination unit 35. The determination unit 35 can determine whether the clutch 14 is engaged on the basis of the hydraulic pressure that is supplied to the clutch 14, for example. The hydraulic pressure that is supplied to the clutch 14 can be detected using a hydraulic sensor or the like (not shown), for example. The hydraulic sensor is, for example, connectable to the oil passage 42 or the like. For example, if the hydraulic pressure that is supplied to the clutch 14 is more than or equal to the threshold, the determination unit 35 may determine that the clutch 14 is engaged. On the other hand, if the hydraulic pressure that is supplied to the clutch 14 is less than the threshold, the determination unit 35 may determine that the clutch 14 is not engaged. Even in this case, the rotation speed of the vehicle driving source 12 can reach the predetermined rotation speed Npd after the clutch 14 is engaged. Therefore, the start command may be supplied to the start device 20 after the clutch 14 is engaged.

The summary of the embodiment is described below.

The start control device (30) is the start control device configured to control the start of the vehicle (10), the vehicle (10) including the clutch (14) that is engaged by the hydraulic pressure supplied from the hydraulic pressure supply source (28) and the start device (20) that starts the vehicle driving source (12), and the start control device (30) includes: the hydraulic pressure control unit (36) configured to control in a manner that the hydraulic pressure supply source supplies the hydraulic pressure to the clutch if the start condition for the vehicle is satisfied; and the start device control unit (38) configured to control the start device in a manner that the rotation speed of the vehicle driving source reaches the predetermined rotation speed (Npd) after the clutch is engaged. In this structure, since the clutch is engaged before the rotation speed of the vehicle driving source reaches the predetermined rotation speed, the engagement shock can be suppressed.

The predetermined rotation speed may be the rotation speed at which it is possible that the clutch slip occurs when the clutch is engaged.

The first time (T1) corresponding to the time after the start command is input from the start device control unit to the start device and before the rotation speed of the vehicle driving source reaches the predetermined rotation speed may be shorter than the second time (T2) corresponding to the time after the supply of the hydraulic pressure from the hydraulic pressure supply source to the clutch is started and before the clutch is engaged. In this structure, since the time after the start command is input from the start device control unit to the start device and before the rotation speed of the vehicle driving source reaches the predetermined rotation speed is relatively short, the vehicle can be started quickly.

The start device control unit may delay the timing (t6) that the start command is input to the start device by the predetermined time (Tpd) with respect to the timing (t5) that the start condition for the vehicle is satisfied, the predetermined time (Tpd) corresponding to the time obtained by subtracting the first time from the second time. In the structure described above, since the clutch is engaged at the proper timing, the vehicle can be started quickly while the engagement shock is suppressed.

The start device control unit may supply the start command to the start device after the clutch is engaged. Even in this structure, since the clutch is engaged before the rotation speed of the vehicle driving source reaches the predetermined rotation speed, the engagement shock can be suppressed.

The hydraulic pressure supply source may be the accumulator configured to accumulate the hydraulic pressure generated by the oil pump (24). In this structure, since the hydraulic pressure can be supplied to the clutch quickly, the vehicle can be started quickly.

The start device may be the integrated starter generator configured to generate power additionally.

The start of the vehicle driving source may be the restart of the vehicle driving source that is automatically stopped when the predetermined stop condition is satisfied.

The vehicle (10) includes the start control device as described above.

The start control method is the start control method for controlling the start of the vehicle, the vehicle including the clutch that is engaged by the hydraulic pressure supplied from the hydraulic pressure supply source and the start device that starts the vehicle driving source, and the start control method includes: the step (S2) of supplying the hydraulic pressure from the hydraulic pressure supply source to the clutch if the start condition for the vehicle is satisfied; and the step (S3, S4) of controlling the start device in a manner that the rotation speed of the vehicle driving source reaches the predetermined rotation speed after the clutch is engaged.

What is claimed is:

1. A start control device configured to control start of a vehicle, the vehicle including a clutch that is engaged by a hydraulic pressure supplied from a hydraulic pressure supply source and a start device that starts a vehicle driving source, the start control device comprising:
    a hydraulic pressure control unit configured to control in a manner that the hydraulic pressure supply source supplies the hydraulic pressure to the clutch if a start condition for the vehicle is satisfied; and
    a start device control unit configured to control the start device in a manner that a rotation speed of the vehicle driving source reaches a predetermined rotation speed after the clutch is engaged,
    wherein the predetermined rotation speed is a rotation speed at which it is possible that a clutch slip occurs when the clutch is engaged.

2. A start control device configured to control start of a vehicle, the vehicle including a clutch that is engaged by a hydraulic pressure supplied from a hydraulic pressure supply source and a start device that starts a vehicle driving source, the start control device comprising:
    a hydraulic pressure control unit configured to control in a manner that the hydraulic pressure supply source supplies the hydraulic pressure to the clutch if a start condition for the vehicle is satisfied; and
    a start device control unit configured to control the start device in a manner that a rotation speed of the vehicle driving source reaches a predetermined rotation speed after the clutch is engaged,
    wherein a first time corresponding to a time after a start command is input from the start device control unit to the start device and before the rotation speed of the vehicle driving source reaches the predetermined rotation speed is shorter than a second time corresponding to a time after supply of the hydraulic pressure from the hydraulic pressure supply source to the clutch is started and before the clutch is engaged.

3. The start control device according to claim 2, wherein the start device control unit delays a timing that the start command is input to the start device, by a predetermined time with respect to a timing that the start condition for the vehicle is satisfied, the predetermined time corresponding to a time obtained by subtracting the first time from the second time.

4. The start control device according to claim 1, wherein the start device control unit supplies the start command to the start device after the clutch is engaged.

5. The start control device according to claim 1, wherein the hydraulic pressure supply source is an accumulator configured to accumulate the hydraulic pressure generated by an oil pump.

6. The start control device according to claim 1, wherein the start device is an integrated starter generator configured to generate power additionally.

7. The start control device according to claim 1, wherein the start of the vehicle driving source is restart of the vehicle driving source that is automatically stopped when a predetermined stop condition is satisfied.

8. A start control method for controlling start of a vehicle, the vehicle including a clutch that is engaged by a hydraulic pressure supplied from a hydraulic pressure supply source and a start device that starts a vehicle driving source, the start control method comprising:
    a step of supplying the hydraulic pressure from the hydraulic pressure supply source to the clutch if a start condition for the vehicle is satisfied; and
    a step of controlling the start device in a manner that a rotation speed of the vehicle driving source reaches a predetermined rotation speed after the clutch is engaged,
    wherein the predetermined rotation speed is a rotation speed at which it is possible that a clutch slip occurs when the clutch is engaged.

* * * * *